United States Patent [19]

Voss et al.

[11] 4,031,293

[45] June 21, 1977

[54] MAINTENANCE FREE LEAD STORAGE BATTERY

[75] Inventors: Ernst Voss, Niederhofheim; Heinrich Rabenstein, Ffm.-Zeilsheim, both of Germany

[73] Assignee: Varta Batterie Aktiengesellschaft, Hannover, Germany

[22] Filed: Feb. 20, 1976

[21] Appl. No.: 659,959

[30] Foreign Application Priority Data

Mar. 6, 1975 Germany .......................... 2509779

[52] U.S. Cl. .................................. 429/60; 429/203; 429/204; 429/225; 429/245

[51] Int. Cl.² ......................................... H01M 10/14

[58] Field of Search ................... 136/26, 27, 76, 65, 136/6 R, 154; 429/60, 203, 204, 225, 245

[56] References Cited

UNITED STATES PATENTS

| 3,227,583 | 1/1966 | Carlisle ............... 136/26 X |
| 3,257,237 | 6/1966 | Jache .................. 136/26 X |
| 3,447,969 | 6/1969 | Tudor et al. .......... 136/26 |

Primary Examiner—Anthony Skapars
Attorney, Agent, or Firm—Weiser, Stapler & Spivak

[57] ABSTRACT

The weight of the negative active mass is below 80% of the positive active mass.

Preferably there is one more positive than negative plates.

5 Claims, 2 Drawing Figures

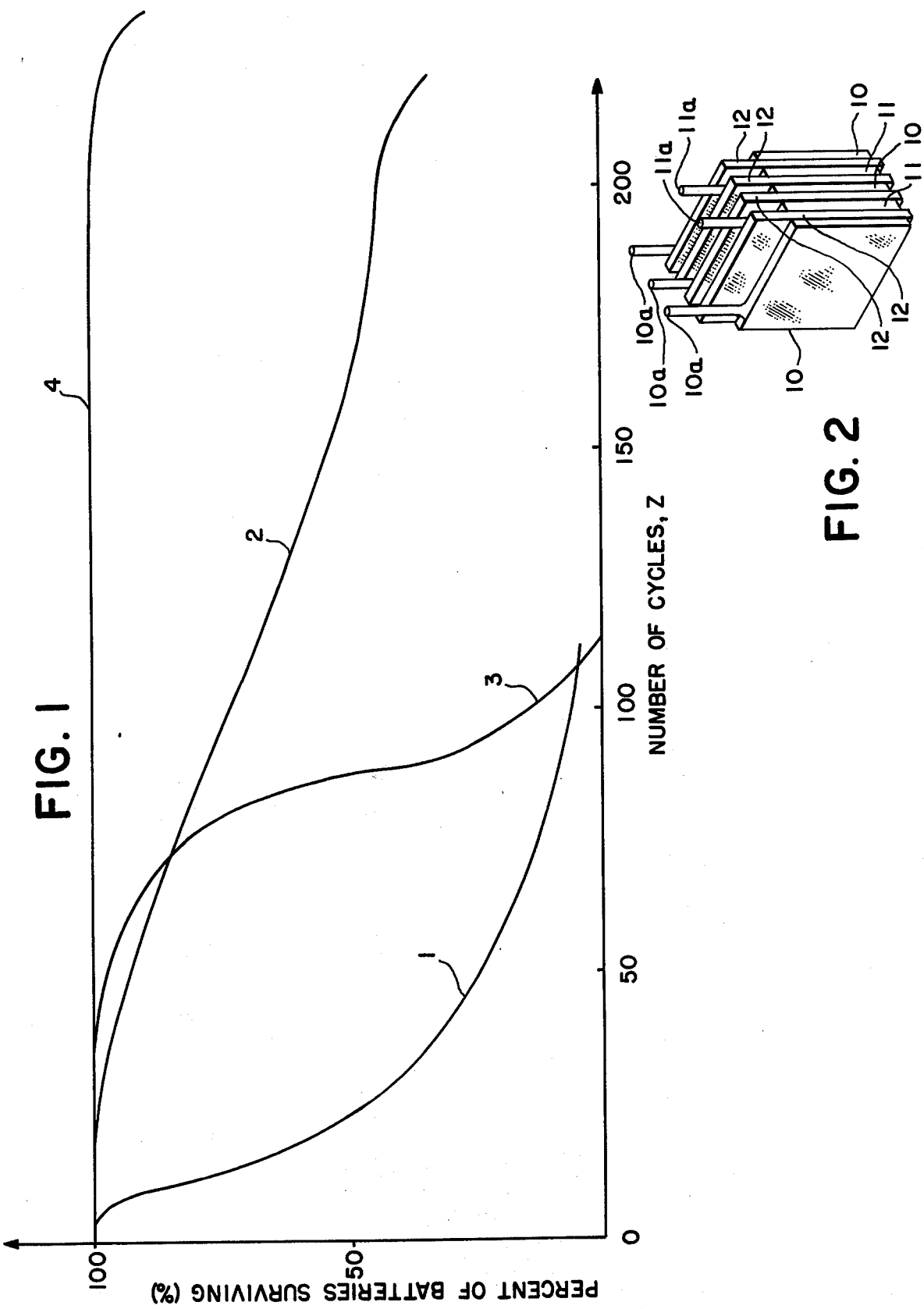

MAINTENANCE FREE LEAD STORAGE BATTERY

The invention relates to a maintenance-free lead storage battery whose electrode grid is made of pure lead or antimony-free lead alloys and which includes a sulfuric acid electrolyte which is absorbed in the pores of the separator and of the active mass.

Maintenance-free lead storage batteries of this type are known in a wide variety of specific forms. In particular, they are used for small storage batteries such as are utilized in photo-flash devices. In such lead storage batteries the electrolyte is generally fixated so that no liquid electrolyte can escape even if the cell is turned upside down. For fixation of the electrolyte, there is generally used a polyelectrolyte, or else the electrolyte is fixated in thixotropic form through addition of silicon dioxide or other materials. This thixotropic electrolyte itself is then introduced, for example, in glass-fiber batting. Also in such storage batteries additives for the electrolyte are used, especially an additive of phosphoric acid. While this creates disadvantages concerning grid corrosion, yet under certain circumstances it enhances the cycling life. In U.S. Pat. No. 3,257,237, for example, there is described a storage battery with thixotropic electrolyte and a phosphoric acid additive in which the enhancement of the lift span is attributable to the combination of thixotropic electrolyte and phosphoric acid additive. The disadvantages of this construction lie particularly in that the introduction of the thixotropic electrolyte into the storage battery is difficult and complicated.

As appears from German Pat. No. 1,180,434, in cells of the type under discussion it has also been proposed to control the dosage quantity of the electrolyte, e.g. in such a manner that, in the storage battery which still contains a certain quantity of freely mobile electrolyte the density of the sulfuric acid is at most 1.20 at the time the battery is placed in operation, i.e. at the start of charging. The excess electrolyte is needed to prevent too rapid a concentration through charging and overcharging, which would greatly shorten the life span.

The importance of the electrolyte regime in storage batteries is known to those skilled in the art. In theory, 4.463 grams of $PbO_2$, and 3.66 grams of $H_2SO_4$ are needed per ampere-hour. In practice, due to the realistically achievable utilization of the active mass, one expects to need 6 to 10 grams of positive mass per ampere-hour and about 13 milliliters of 37% sulfuric acid per ampere-hour. Under these conditions, an acid density of 1.1 is not exceeded during operation of the storage battery.

In all known storage batteries, the negative electrode is always over-dimensioned with respect to its capacity by 10 to 40%. This is intended to produce desirable low temperature performance, to counteract the pronounced tendency toward sulfation of the negative electrode, and also to facilitate an oxygen cycle. In practice this over dimensioning of the negative electrode is usually accomplished by providing the storage battery cell with one more negative than positive electrode. Thus, the end plates are always negative. As further reason for this construction, it is also recognized that positive end plates present substantial disadvantages in that their active mass is subject to greater volume changes during charging and discharging. Unidirectional loading of the end plates therefore places even heavier mechanical strains upon the plate. For these reasons, it has been generally accepted that the cells should always contain more negative than positive electrode plates.

Accordingly, it is an object of the invention to provide a lead storage battery of the type under consideration, which has long life and high capacity relative to its volume, and which is particularly characterized by simple construction.

This and other objects which will appear are achieved in accordance with the present invention by keeping the weight of the negative active mass at less than 80% of the weight of the positive active mass. The electrolyte quantity and concentration are so proportioned that, after 20-hour current discharge the acid density is at most 1.07 grams per $cm^3$.

The inventive proportioning of the electrode mass is preferably achieved by departing from the construction which is customary in the lead storage battery art and by building, for example, a cell which has four positive and three negative electrodes (inverted construction). This produces a capacity increase which corresponds to the positive mass increase. The greater acid dilution accompanying the increased capacity discharge is offset by the lower surface loading of the positive electrode. In this construction embodying the invention, the capacity is also limited by the positive electrode. The positive mass utilization has its customary values. On the other hand, the apparent mass utilization of the negative electrode is increased by this inverted construction. Such proportioning results in considerable enhancement of the cycling capability. This is attributable to the fact that the recharging takes place at considerably diluted acidity, and this promotes the reformation of $\alpha$-$PbO_2$.

For further details, reference is made to the discussion which follows, in light of the accomanying drawings, wherein FIG. 1 shows, for various forms of construction of maintenance-free lead storage batteries, their percentage survival L as a function of the number of cycles Z; and FIG. 2 shows in somewhat diagrammatic form the electrode structure of a battery embodying the invention.

Referring first to FIG. 1, in the data presented in that figure, the criterion for end of life is a drop below 60% of nominal capacity. Charging always takes place by the so-called I-U regime. This involves charging at constant current until the gas evolution potential is reached, and then continuing the charging at constant voltage. During the latter stage, the current declines.

Curve 1 of FIG. 1 shows the performance of a maintenance-free storage battery in accordance with the state of the art, i.e. a storage battery which contains more negative than positive electrodes, whose electrolyte is not thixotropic, and whose electrolyte does not contain phosphoric acid. The electrolyte is fixated in a glass or plastic fiber batting, and the electrolyte quantity is proportioned in conventional manner so that an electrolyte density of 1.10 grams per $cm^3$ is reached at the end of the discharge.

Curve 2 of FIG. 1 shows the performance for the abovedescribed inverted construction, with reduced electrolyte density at the end of discharge. The condition is also met that the weight of the negative active mass is below 80% of the weight of the positive active mass. To the surprise of those skilled in the art, this yields a substantial increase in life-span and capacity.

Curve 3 of FIG. 1 shows a storage battery of conventional construction, as described in connection with Curve 1, but whose electrolyte contains an additive of 30 grams per liter of phosphoric acid.

Finally, Curve 4 of FIG. 1 shows the performance of a storage battery in accordance with the invention in which there is further added to the electrolyte 30 grams per liter of phosphoric acid. Here too, despite not using a thixotropic electrolyte, substantial improvement of the cycling capability is achieved.

FIG. 2 shows the electrode plate assembly of a battery embodying the invention. This assembly includes three positive plates 10, and only two negative plates 11. Thus, there is one more positive than negative plates, in accordance with the inverted construction which characterizes the invention.

Conventional separators 12 are positioned between adjacent plates 10 and 11.

Plate lugs 10a and 11a protrude from positive and negative plates 10 and 11, respectively.

This assembly of FIG. 2 may be enclosed in a conventional plastic battery case (not shown). The lid of such a case may have the construction shown, for example, in U.S. Pat. No. 3,836,401, except that the number of apertures in the lid of the battery case would, of course, be adjusted to correspond to the number of plates (and plate lugs) used. Pole bridges as shown in the said U.S. Patent may be used to connect the plate lugs of like polarity.

We claim:

1. A maintenance-free lead storage battery having an electrode grid of lead or antimony-free lead alloy, a separator and sulfuric acid electrolyte in the pores of the separator and the active mass, and characterized in that the weight of the negative active mass is less than 80% of the weight of the positive active mass, the quantity and concentration of the electrolyte is so proportioned that the acid density is no more than 1.07 grams per $cm^3$ after 20-hour current discharge; and comprising N negative electrodes and N+1 positive electrodes positioned in alternating positive and negative arrangement.

2. The battery of claim 1 wherein the electrolyte contains phosphoric acid in proportions of about 20 to about 40 grams per liter, and preferably in proportions of 30 to 35 grams per liter.

3. The battery of claim 1 wherein the end electrode plates are positive.

4. The electrode of claim 2 wherein the electrolyte is not thixotropic.

5. The battery of claim 2 having a cycling capability in excess of 200 cycles.

* * * * *